(12) United States Patent
Nowshadi et al.

(10) Patent No.: US 8,848,848 B2
(45) Date of Patent: Sep. 30, 2014

(54) TRANSMISSION TIMING ADJUSTMENT IN RADIO SYSTEMS

(75) Inventors: Farshid Nowshadi, Harston (GB); Steven Wenham, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 573 days.

(21) Appl. No.: 12/980,588

(22) Filed: Dec. 29, 2010

(65) Prior Publication Data
US 2011/0164710 A1  Jul. 7, 2011

(30) Foreign Application Priority Data
Jan. 4, 2010  (GB) .................................. 1000012.3

(51) Int. Cl.
*H04L 7/00* (2006.01)
*H04L 7/02* (2006.01)

(52) U.S. Cl.
CPC ....................................... *H04L 7/02* (2013.01)
USPC ....................................................... 375/354

(58) Field of Classification Search
CPC .......... G08C 17/00; G08C 19/16; H04B 1/38; H04B 1/69; H04B 7/00; H04B 7/04; H04L 5/16; H04L 7/00; H04L 7/10; H04L 25/40; H04W 4/04; H04W 24/04; H04W 56/00
USPC .......... 370/331, 350, 310, 311; 375/316, 354, 375/355, 356, 358, 362, 368, 371, 219, 375/295; 455/88, 442, 517; 714/731
See application file for complete search history.

(56) References Cited

U.S. PATENT DOCUMENTS

| 2008/0300003 | A1* | 12/2008 | Jeck et al. ..................... 455/517 |
| 2010/0302979 | A1* | 12/2010 | Reunamaki ................... 370/311 |
| 2011/0176534 | A1* | 7/2011 | Subramanian et al. ....... 370/350 |

* cited by examiner

*Primary Examiner* — Sam K Ahn
*Assistant Examiner* — Shawkat M Ali
(74) *Attorney, Agent, or Firm* — Fulbright & Jaworski LLP

(57) ABSTRACT

A method of adjusting the transmission time of a signal in a radio link, the method being performed by a transmitter configured to transmit the signal over the radio link to a receiver and comprising the steps of ascertaining an accuracy that the receiver assumes for the transmitter's clock, calculating an assumed drift of the transmitter's clock based on the assumed accuracy of that clock and the time since a previous correlation between the transmitter's clock and the receiver's clock; and transmitting the signal at a time dependent on the assumed drift.

8 Claims, 1 Drawing Sheet

TRANSMISSION TIMING ADJUSTMENT IN RADIO SYSTEMS

BACKGROUND

This invention relates to reducing power consumption in radio systems, and in particular to reducing power consumption in a receiver by modifying transmission patterns.

The power consumption of a radio receiver is significantly higher when it is active to receive signals, but it is only necessary for a receiver to be in that active state when the receiver is actually attempting to receiving a signal.

In order to reduce power consumption during periods when there is no active transmission between a transmitter and a receiver, it is known for the radio link to be generally inactive, but for a polling signal to be transmitted intermittently at anchor points to maintain contact between the two ends of the link. In between the transmission of the polling signal, the receiver can be powered-down, thus reducing average power consumption. For example, a typical Bluetooth radio system may transmit a 126 µs polling signal every 1 s.

For optimum power reduction, the receiver should only be active for the duration of the polling signal. However, this is only possible if the transmitter and receiver have perfectly aligned clocks such that the signal is transmitted at the correct time, and the receiver is activated at that correct time. However, transmitter and receiver clocks are not perfect and drift over time. The receiver must thus be activated for a window sufficiently large to account for the clock drifts of the transmitter and receiver.

In an example system anchor points are at 1 s intervals and the transmitter has a clock accuracy of 250 ppm. Over the 1 s between anchor points there will be a clock drift of up to 250 µs in the transmitter's clock compared to actual time. The polling signal may therefore be transmitted up to 250 µs before or after the actual anchor point. The receiver must therefore be activated 250 µs before the actual anchor point to ensure the polling signal is received. However, the start of the polling signal may not actually be received until 250 µs after the actual anchor point, meaning the receiver has been active for 500 µs waiting for the signal in addition to the time to receive the signal.

Drift in the receiver clock must also be accounted for which may result in further widening of the receiver activation window.

The Bluetooth low energy protocol partly addresses the above widening of receiver activation windows by transmitting an indication of the transmitter clock accuracy to the receiver. This gives the receiver a more accurate knowledge of the transmitter's clock accuracy and hence the likely arrival time of polling signals allowing a reduction in activation windows. However, the transmitter does not send an accurate value of the clock accuracy, but only a window within which the clock accuracy falls. The receiver must assume the accuracy is the worst value in the window meaning the receiver may be activated earlier than required as the actual accuracy may be better than the worst value.

In the Bluetooth BR/EDR protocol the clock drift is not transmitted, but the receiver simply assumes an accuracy of 250 ppm in low power modes, which is the maximum permitted for transmitter clocks under this protocol.

Receiver power consumption could therefore be improved by accounting for clock accuracy in an improved manner.

The embodiments described below are not limited to implementations which solve any or all of the disadvantages discussed above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of adjusting the transmission time of a signal in a radio link, the method being performed by a transmitter configured to transmit the signal over the radio link to a receiver and comprising the steps of ascertaining an accuracy that the receiver assumes for the transmitter's clock, calculating an assumed drift of the transmitter's clock based on the assumed accuracy of that clock and the time since a previous correlation between the transmitter's clock and the receiver's clock; and transmitting the signal at a time dependent on the assumed drift.

The signal may be transmitted earlier than a predetermined transmission time for the signal.

The signal may be transmitted earlier than the predetermined transmission time by a time approximately equal to the assumed drift of the transmitter's clock.

The time may be selected to be closer to an activation time of the receiver than a predetermined transmission time for the signal would be.

The assumed accuracy for the transmitter's clock may be the maximum permissible accuracy for a transmitter clock in the protocol being utilised.

The method may further comprise the step of transmitting an indication of the transmitter's clock accuracy from the transmitter to the receiver, wherein that indication comprises a range of accuracy values.

The assumed accuracy for the transmitter's clock may be the maximum value in the transmitted range.

The signal may be a periodic polling signal.

The transmitter and receiver may operate according to a Bluetooth protocol.

There is also provided a wireless transmitter configured to transmit a signal to a receiver at a time defined by the methods described above.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The unnecessary widening of the receiver activation window discussed above occurs due to a lack of knowledge at the receiver of the accuracy of the transmitter clock. A transmitter may know the accuracy of its own clock, but if the particular radio protocol being utilised does not provide for the transmission of that accuracy to the receiver it cannot be utilised to minimise the receiver activation window. The receiver must therefore make a worst-case assumption of the clock accuracy. For example, in the Bluetooth low energy protocol the receiver assumes the clock accuracy is the worst value in the particular range transmitted by the transmitter. In other formats it may assume the accuracy is the worst allowable for a transmitter according to the protocol implemented. In all cases, the transmitter will know the value that the receiver will assume for the accuracy of the transmitter clock, and the actual accuracy of that clock.

Figure 1:
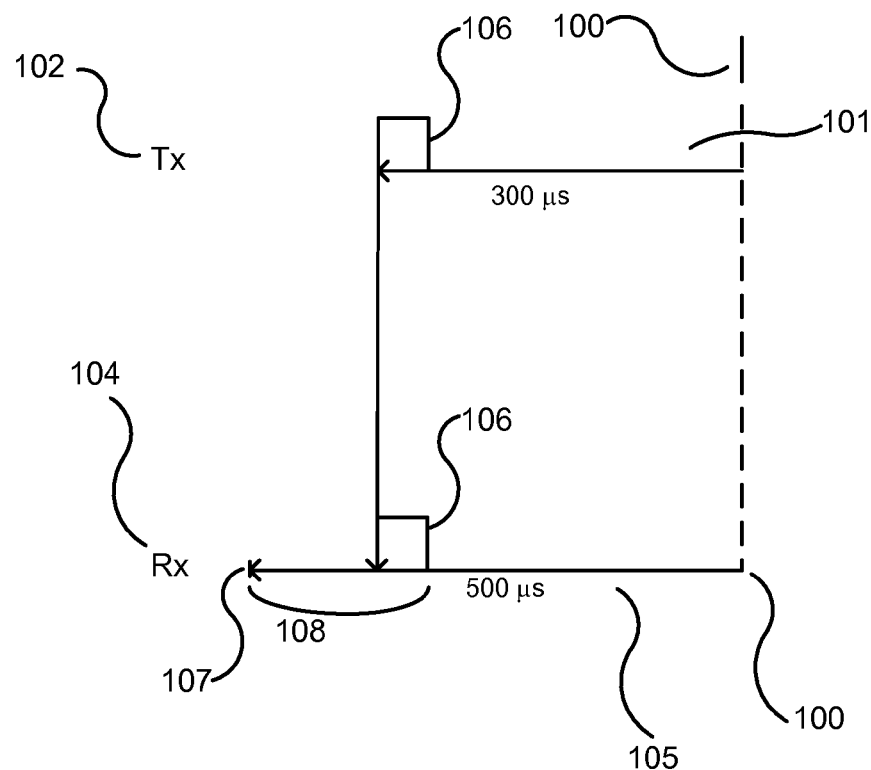
FIG. 1 shows a timing diagram for the transmission of a polling signal.

FIG. 1 shows a timing diagram for a first example of a Bluetooth low energy system operating with actual anchor points 100, 1 second apart. The transmitter clock is running fast by 300 ppm and therefore in normal operation would transmit the polling signal 106, 300 μs before the actual anchor point 100. In accordance with the Bluetooth low energy protocol, during establishment of the connection, the transmitter 102 will have notified the receiver 104 that its accuracy lies in the range 251-500 ppm, and the receiver 104 will have assumed the worst case accuracy of 500 ppm. The receiver 104 is therefore activated 500 μs 105 before the actual anchor point 100 to ensure it is active when the polling signal 106 is transmitted.

However the actual drift is only 300 μs and so the receiver 104 is activated 200 μs 107 before the polling signal 106 is received. If the polling signal length is X μs, and the receiver shuts down after receipt of that signal, the receiver is active 108 for 200 μs+X μs, compared to X μs if it was activated just in time to receive the polling signal 106. X is generally small, for example in a Bluetooth low energy system the shortest time will be 80 μs.

Figure 2:
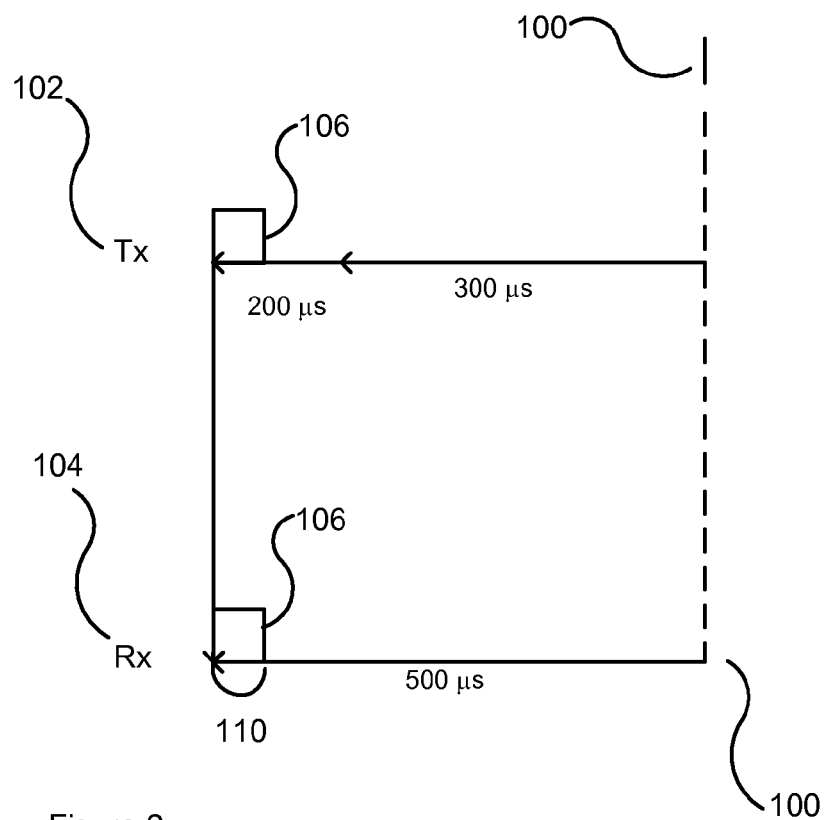
FIG. 2 shows a timing diagram for the transmission of a polling signal at an adjusted time.

The transmitter 102 knows the assumption the receiver 104 will have made about the accuracy of the transmitter 102 clock and hence can calculate the time at which the receiver is activated. As shown in FIG. 2 the transmitter 102 can therefore adjust the transmission time of the polling signal 106 such that it is transmitted at the start of the receiver activation window. In this example, the actual clock drift is 300 μs, but the transmitter knows the receiver will have assumed the clock drift is 500 μs. The polling signal is thus transmitted 200 μs early (according to the transmitter's clock, which is 500 μs in actual time) and the polling signal arrives at the start of the activation window. The receiver 104 is therefore active only for the time 110 to receive the polling signal 106, leading to a reduction, in this example, in the activation time from 200 μs+X μs to X μs (X may be, for example, 80 μs). In summary, the polling signal is transmitted before the predetermined transmission time for the polling signal.

The transmission point of the polling signal is therefore calculated according to the difference between the actual transmitter's clock accuracy and that assumed by the receiver, and the time since the transmitter and receiver clocks were last aligned (or when the relationship between the two clocks was last known if the clocks are not aligned according to the particular system). In the above example the receiver correlates its clock with the transmitter clock at each polling signal and therefore the time utilised to calculate the drift is 1 second. However, if a polling signal is missed, the total time since last the successful signal may be utilised. For example, if one signal is missed, the time in the above example is 2 seconds and so the receiver will have calculated a maximum drift of 1 ms (500 ppm×2 seconds). The actual clock drift is 600 μs (300 ppm×2 seconds), allowing the signal to be transmitted 400 μs early.

The transmitter may only know the magnitude of the clock accuracy, and not the direction (fast or slow). In the above example, the clock was running fast, but if the clock was running slowly, without any adjustment, the polling signal would be transmitted 300 μs after the actual anchor point. Since the transmitter is not aware of the direction of the accuracy value, the adjustment process described above is applied in the same manner. The transmission time is therefore adjusted by 200 μs, and so the actual transmission time is 100 μs after the actual anchor point. Although this is still later than the start of the activation window, the polling signal is received 200 μs earlier than if there was no adjustment, thereby leading to a power saving.

The receiver's clock may also not be perfect and may drift from the actual time. To account for this drift, the receiver must activate itself earlier than may actually be required, in a similar way to the early activation for the transmitter clock drift. However, the transmitter does not know the accuracy of the receiver and so cannot adjust the transmission time to transmit the polling signal closer to the activation time.

In the above example, the receiver is sent an indication of the range of the clock drift, but not the accurate value. The same principles used in that example apply when there is no transmission of the clock drift to the receiver. The receiver assumes the worst-case allowable clock accuracy for the transmitter and calculates the transmitter's clock drift since the previous anchor point. The receiver is activated at a time to ensure the polling signal is received, even at that worst case accuracy. The transmitter also knows the worst allowable accuracy, and its actual accuracy, and so can adjust the transmission time to lie at the start of the receiver activation window.

The above methods of adjusting the transmission time of the polling signal are independent of the radio protocol being utilised and the receiver is unaware that any modification of conventional behaviour has occurred. The methods can therefore be implemented relatively simply without need for modification of the transmitter or receiver systems, other than to adjust the transmission time dependent on the clock drift of the transmitter and the drift assumed by the receiver.

The above description has been given in the context of a Bluetooth system, but the principles are equally applicable to any radio system in which the transmitter has a more accurate measure of its clock drift than the receiver.

As will be apparent to the reader, the reduction in activation time that is achieved by the methods described herein depends upon the difference between the actual clock accuracy of the transmitter and the value assumed by the receiver. The closer the assumed value is to the actual value, the less saving will be achieved.

To allow for errors in clock drift estimation, the time for transmission from the transmitter to the receiver, and other timings of the system, the receiver may be activated earlier than the time suggested by only the clock accuracy figures. Similarly, the transmission of the polling signal may be delayed from the earliest possible time, as per the examples given above, to account for such possible errors.

In the above examples the transmitter and receiver are assumed to correlate their clocks at each anchor point. The clock drift does not therefore accumulate over multiple periods between anchor points. If the clocks are not correlated at each anchor point, the activation windows must become wider to account for the accumulating drift. Similarly, as the period between anchor points increases the clock drift increases and the potential savings through the methods described above may also increase.

The above description has been given in the context of the transmission of a periodic polling signal, but as will be appreciated it may also be applied in other situations where the transmitter and receiver must be active at a particular coordinated time.

Where the term 'correlated' is used to describe the relationship between the clocks, it will be appreciated that it is not required that the clocks be adjusted to a known reference, but only that the relationship between the clocks be known. This may be achieved by adjusting one or both clocks, or storing data describing the relationship.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method of adjusting a transmission time of a signal in a radio link, the method being performed by a transmitter to transmit the signal over the radio link to a receiver and the method comprising the steps of: ascertaining, at the transmitter, an accuracy that the receiver assumes for the transmitter's clock, calculating, at the transmitter, an assumed drift of the transmitter's clock based at least on the assumed accuracy that the receiver will have made of the transmitter's clock and a time since a previous correlation between the transmitter's clock and the receiver's clock; and transmitting, by the transmitter, the signal at a time dependent on the assumed drift such that the transmission time is closer to the receiver's activation time than a predetermined transmission time for the signal, wherein the transmitter and the receiver operate according to a Bluetooth Low Energy (LE) system.

2. A method according to claim 1, wherein the signal is transmitted earlier than the predetermined transmission time for the signal.

3. A method according to claim 2, wherein the signal is transmitted earlier than the predetermined transmission time by a time approximately equal to the assumed drift of the transmitter's clock.

4. A method according to claim 1, wherein the assumed accuracy for the transmitter's clock is a maximum permissible accuracy for a transmitter clock in the protocol being utilised.

5. A method according to claim 1, further comprising the step of transmitting an indication of the transmitter's clock accuracy from the transmitter to the receiver, wherein that indication comprises a range of accuracy values.

6. A method according to claim 5, wherein the assumed accuracy for the transmitter's clock is the maximum value in a transmitted range.

7. A method according to claim 1 wherein the signal is a periodic polling signal.

8. A system comprising: a transmitter configured to transmit a signal over a radio link to a receiver, wherein the transmitter is configured to: ascertain an accuracy that the receiver assumes for the transmitter's clock, calculate an assumed drift of the transmitter's clock based at least on the assumed accuracy that the receiver will have made of the transmitter's clock and a time since a previous correlation between the transmitter's clock and the receiver's clock, and transmit the signal at a time dependent on the assumed drift such that the transmission time is closer to the receiver's activation time than a predetermined transmission time for the signal, wherein the system further configured to operate according to a Bluetooth Low Energy (LE).

* * * * *